I. McC. HALL.
TOY.
APPLICATION FILED FEB. 27, 1920.

1,368,718.

Patented Feb. 15, 1921.

Inventor
I. M. Hall
By Victor J. Evans
Attorney

I. McC. HALL.
TOY.
APPLICATION FILED FEB. 27, 1920.
1,368,718.
Patented Feb. 15, 1921.
2 SHEETS—SHEET 2.
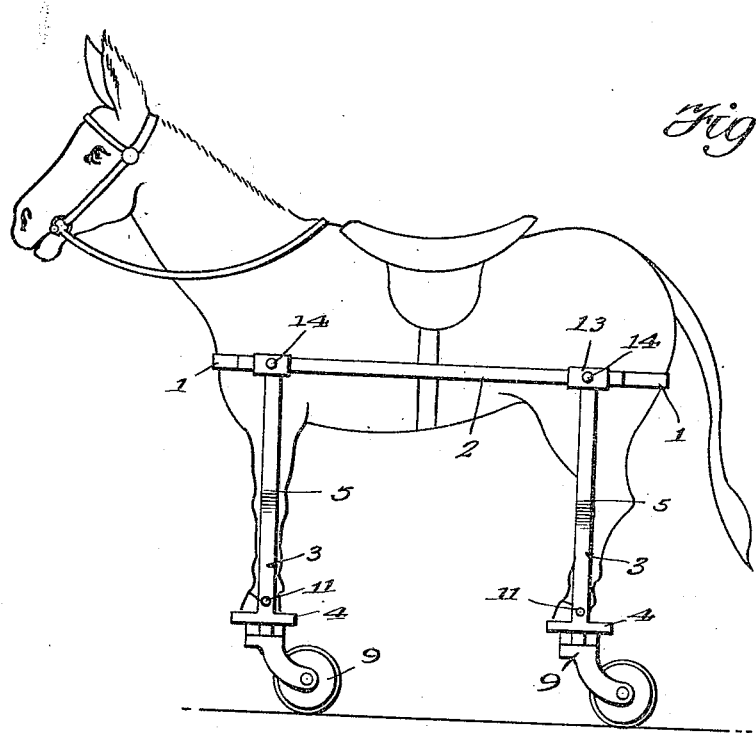
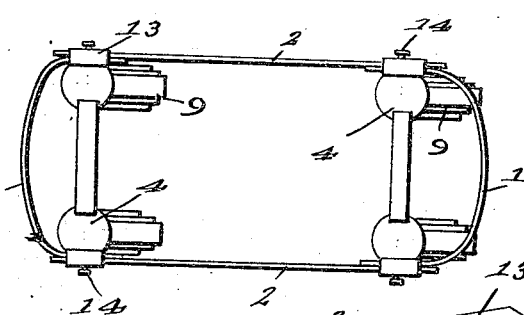
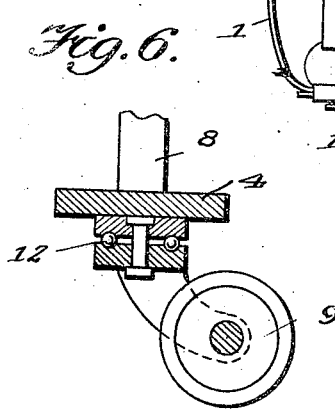
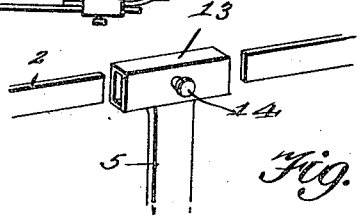
Inventor
I. M. Hall
By Victor J. Evans
Attorney

UNITED STATES PATENT OFFICE.

INA McCAULEY HALL, OF GADSBY, ALBERTA, CANADA.

TOY.

1,368,718.　　　Specification of Letters Patent.　　Patented Feb. 15, 1921.

Application filed February 27, 1920. Serial No. 361,744.

*To all whom it may concern:*

Be it known that I, INA M. HALL, a subject of the King of Great Britain, residing at Gadsby, in the Province of Alberta and Dominion of Canada, have invented new and useful Improvements in Toys, of which the following is a specification.

This invention relates to improvements in toys and the principal object of the invention is to provide a wheeled frame which may be attached to different kinds of toy animals so that the animal may be ridden by a child and when he gets tired of one animal he may place the frame upon another one and ride this.

Another object of the invention is to provide means for adjusting the frame so that it may be made to fit the different kinds of toy animals.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Fig. 2 is a view showing the frame attached to another kind of a toy animal.

Fig. 4 is a plan view of the frame.

Fig. 6 is a sectional detail view through the caster wheel support.

Fig. 7 is a view showing how the end portions are connected with the uprights.

Figure 1:
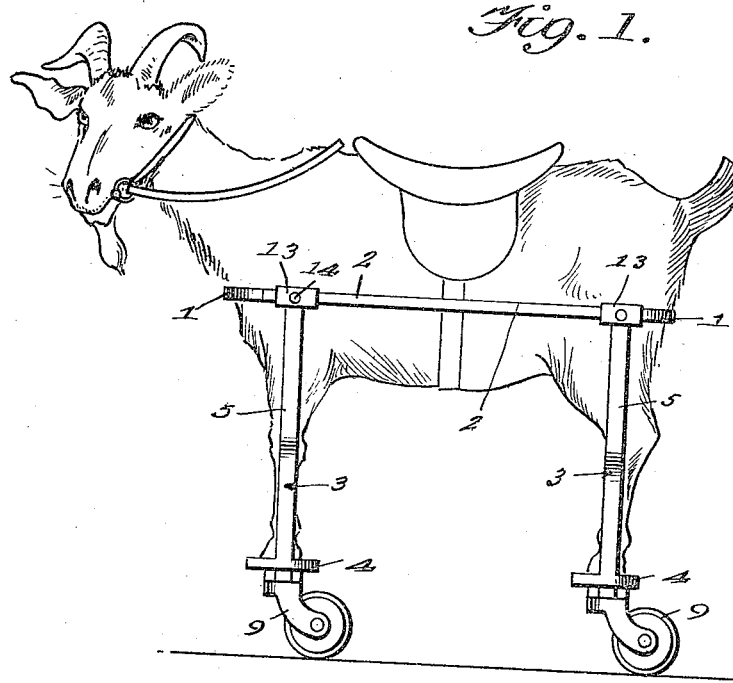
Figure 1 is a view showing the frame attached to one kind of a toy animal.
Figure 3:
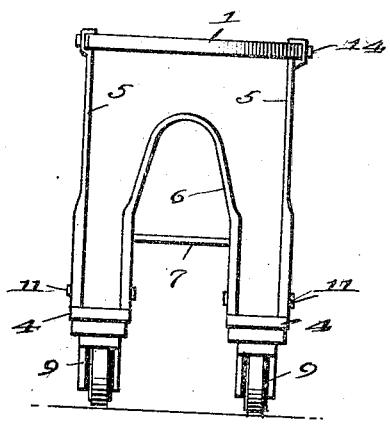
Fig. 3 is an end view of the frame.
Figure 5:
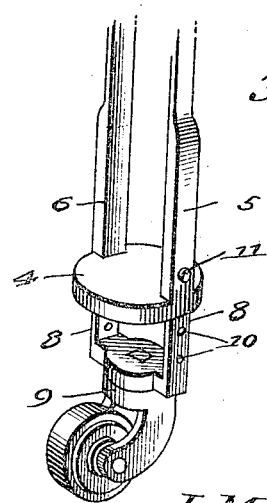
Fig. 5 is a detail view showing how the caster wheels are adjustably connected with the frame.

As shown in these views the frame comprises a pair of U-shaped members 1 for engaging the breast and hind quarters of the animal, the side bars 2 and the pair of upright frames 3 which carry the base pieces 4 on which the feet of the animal rest. As shown each upright frame consists of a pair of outer bars 5 and an inverted U-shaped member 6, the limbs of which are connected with the two bases. This U-shaped member is strengthened by the cross brace 7. The ends of said U member and the ends of the upright rods 5 are suitably secured to the bases and these ends are enlarged and hollow so as to receive the upwardly extending arms 8 carried by the caster 9. These arms are provided with the holes 10 for receiving the screws 11 carried by said hollow ends. In this way the height of the frame may be adjusted. As shown in Fig. 6 the caster is provided with the ball bearings 12 so as to reduce friction and make the toy easy to turn.

The upper ends of the outer bars 5 carry the horizontal sockets 13 for receiving the ends of the U-shaped frame 1 and the ends of the side bars 2 and these ends are clamped in said sockets by the screws 14.

This frame is adapted to be placed on animals such as those shown in Figs. 1 and 2. The animal is placed in the frame with its feet resting on the bases 4. The end frames 1 are then forced toward each other to firmly engage the breast and hind quarters of the animal and then the screws 14 are tightened to clamp these frames in adjusted position to the upright frames. The side bars 2 will prevent the end and wheel frames from separating and coming off the toy animal. The casters are adjusted to place the animal the correct distance from the ground so that the child's feet, when he is seated upon the animal, will engage the ground and thus enable him to propel himself along as in the well known type of "kiddie car." The side bars 5 of the upright frames extend along the outer sides of the legs of the animal while the members 6 engage the insides of the legs. By means of the rotatable casters the direction of travel of the animal may be easily changed so as to turn corners or to make a return trip.

After the child gets tired of riding one kind of animal he may remove the frame and place it on another kind of animal, it being understood that a number of different kinds of animal will be provided to be sold with the frame.

If desired or found necessary I may provide means on the bases for clamping or otherwise securing the feet of the animal thereto.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A toy of the class described comprising a toy animal and a wheeled frame therefor comprising front and rear wheel carrying frames for engaging the front and rear parts of the toy animal and means for adjustably connecting the two frames together.

2. A wheeled supporting frame for a toy animal comprising front and rear wheel carrying frames for receiving the front and rear parts of the toy animal, side bars and means for adjustably connecting the side bars to the two frames.

3. A toy of the class described comprising a toy figure, a wheeled frame adjustably secured thereto and comprising U-shaped members, standards removably connected to the ends of said members, means for adjustably connecting the standards of each side of the animal together, a wheeled base connected to each standard and an inverted U-shaped frame connecting each pair of bases together.

4. A toy of the class described comprising a toy animal, a supporting frame therefor, comprising a pair of U-shaped members, a pair of upright frames each consisting of a pair of outer bars, a pair of bases connected with the lower ends of said bars, and an inverted U-shaped member connecting the two bases together, socket members carried by the upper ends of the outer bars, clamping means carried by said socket members for engaging the ends of the U-shaped end members, side bars also engaged by said clamping means, rotatable caster wheels and means for adjustably connecting the same to the bases so that said casters may be adjusted vertically.

In testimony whereof I affix my signature.

INA McCAULEY HALL.